April 5, 1927.　　　　　　　　　　　　　　　　1,623,549
A. NOSAN
AIRCRAFT VARIABLE PITCH PROPELLER AND BLADE MOUNTING
Filed Feb. 8, 1926
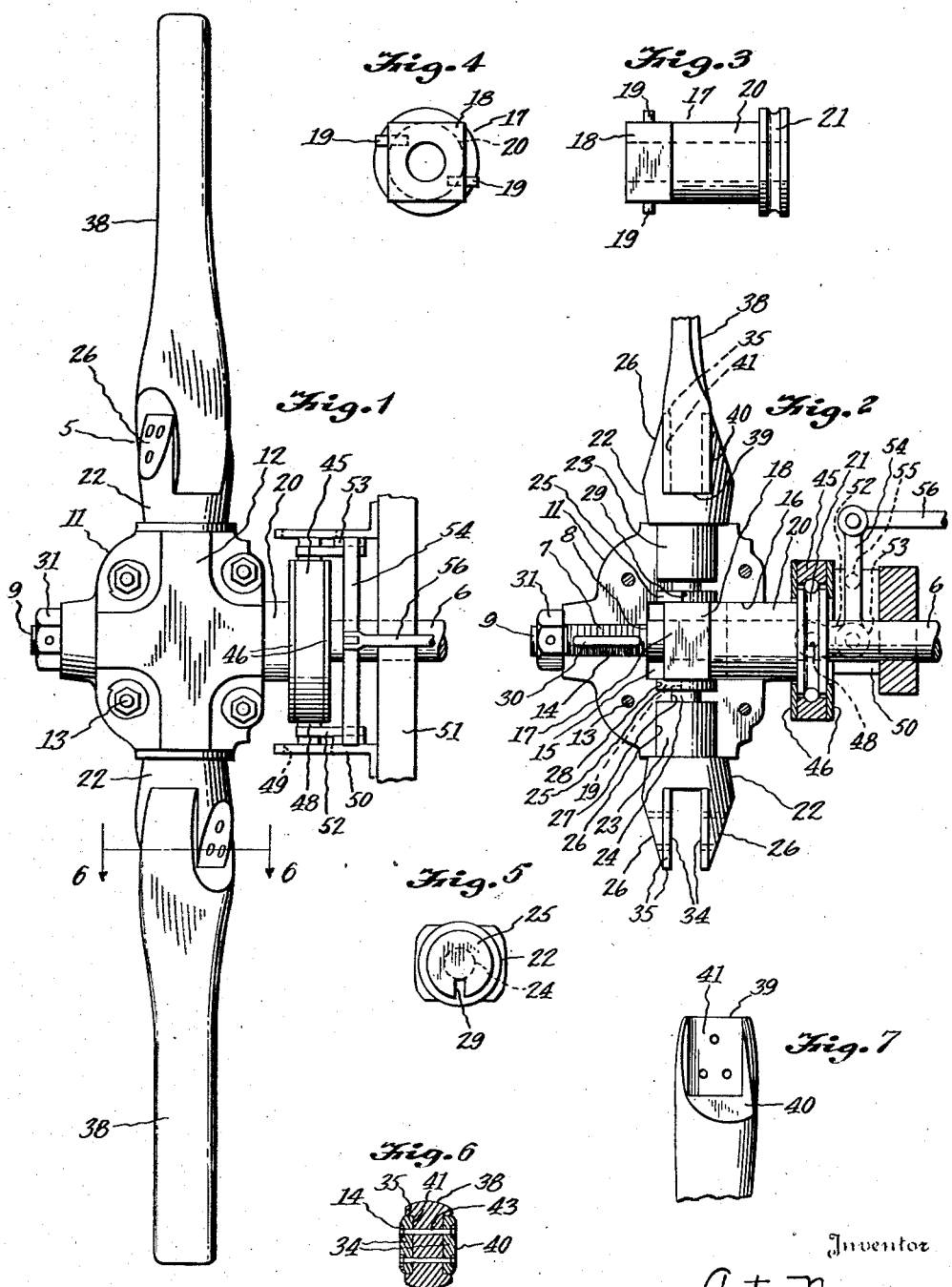

Patented Apr. 5, 1927.

1,623,549

UNITED STATES PATENT OFFICE.

ANTON NOSAN, OF CLEVELAND, OHIO.

AIRCRAFT VARIABLE-PITCH PROPELLER AND BLADE MOUNTING.

Application filed February 8, 1926. Serial No. 86,883.

This invention relates to new and useful improvements in aircraft propellers and more particularly to aeroplane, hydroplane and airship propellers providing improved means for quickly and accurately setting or varying the pitch or angle of the blades for facilitating and increasing the flying and ground maneuvering and to meet different conditions of the air.

Another object is to provide a propeller of strong, compact and simple construction easily assembled or repaired.

Another object is to provide an improved propeller blade mounting.

When turning the propeller by hand for starting the motor, the blade may be set to neutral pitch to avoid the suction created by the ordinary propeller which tends to draw the starter into the whirling blades when the motor starts, causing serious accidents and demolishing the propeller. With the blades in neutral pitch the strong backwash of air, while the motor is running, is avoided while the aeroplane or hydroplane is at rest.

The adjustability of the blades permits control by the aeroplane pilot of a greater range of maneuvering over the ground and by substituting a pivoted guide wheel in lieu of the usual tail post the aeroplane may be backed into its shed upon reversing the blades.

When starting the flight of the aeroplane or hydroplane, the blade pitch may be adjusted to give the best results for picking up speed and lifting quickly into the air from the starting point with a minimum amount of starting run.

For ordinary flying the blades may be set at standard pitch.

A landing in a minimum amount of space is accomplished by reversing the blades which then act oppositely against the air, retarding the machine and bringing it to rest quickly after landing.

The propeller when adapted to the motors of airships or dirigibles permits greater control and ease of maneuvering while launching, in the air or when landing.

Other objects and features of the invention will be hereinafter pointed out and described.

In the drawings:—

Fig. 1 is an enlarged view of the propeller.

Fig. 2 is a view thereof partly in section with parts removed.

Fig. 3 is a detail view of the blade shifting block.

Fig. 4 is an end view thereof.

Fig. 5 is an end view of a blade base.

Fig. 6 is a section on line 6—6 of Fig. 1.

Fig. 7 is a fragmentary view showing the butt of a blade.

Referring to the drawings 5 indicates generally the improved propeller mounted on an aircraft motor crank shaft 6 reduced and screw threaded as at 7 forming a shoulder 8 and further reduced and screw threaded as at end 9. The propeller blades are oppositely mounted in a hub 11 of matched halves 12 securely bolted together as at 13 and internally screw threaded at 14. Hub 11 is provided with an internal guideway 15 substantially rectangular in form and an annular guideway 16 adapted to slidably receive and retain a blade shifting block 17 comprising a substantially square head 18 adapted to have sliding movement in guideway 15 and a cylindrical extension 20 adapted to slide in annular guideway 16. The extension 20 carries a ball bearing race 21 and the head 18 has oppositely arranged eccentric pins 19.

The blade bases 22 have shouldered posts 23, necks 24 and disk-shaped retaining heads 25 adapted to have turning movement in conforming sockets 26, 27 and 28 respectively in hub 11. Each disk-head 25 has a radial slot 29. The slots are positioned, relative to each other, radially opposite and receive pins 19 which are oppositely and equally spaced off center of the blade base axis. Sliding movement either way of block 17 causes the pins 19 to thrust against the sides of slots 19, turning the disk-heads and blade mountings oppositely.

The propeller is mounted on the engine crank shaft 6 by sliding on the block 17 over the shaft end and screwing up the threaded section 14 on the threaded shaft 7 butting against shoulder 8 and inserting key 30. A nut 31 is then drawn up on the threaded shaft end 9 tightly against frame 11 and pinned.

The blade bases 22 are substantially round with spaced square yoke ends 34 having square edges 35 and angular sides 26 provided with countersunk bolt holes.

The propeller blades 38 shaped of wood may be laminated or of one piece construction and are formed at the butt with a squared end 39 and sides 40 rectangularly inset as at 41 and provided with bolt holes.

The blades 38 are easily and quickly attached by inserting the butt into the base yoke, the inset sides 41 snugly engaging the square yoke ends 34 and edges 35 and secured by bolts 43 passing through the blade butt and yoke end bolt holes and drawn up by pinned nuts 14.

Means for actuating the sliding block 17 and adjusting the blade pitch is provided by a ball bearing retaining ring 45 having side thrust wearing rings 46 engaging ball race 21. Movement of ring 45 is guided by lateral studs 48 thereof in slots 49 of angle brackets 50 secured to brace 51. Ring 45 is actuated through links 52 pivoted to studs 48 and the ends 53 of a yoke-shaped lever 54 pivoted at 56 to brackets 50 and rocked by rod 55 attached to the upper end of lever 54.

Manifestly, the construction shown herein is capable of considerable modification and such modification as may fall within the scope of the appended claim, I consider within the spirit of my invention.

I claim:—

The combination of a shaft, a hub fixed thereto and having a central recess forming a guide and radial bearing recesses communicating therewith, propeller blades having stems mounted to turn in said radial recesses, said stems having slotted enlargements at their inner ends, a tubular block thru which the shaft extends, shiftable axially and guided in the central recess and along the shaft and having eccentric pins engaging said slots, and means to shift the block, the central recess being partly circular and partly angular in cross-section and the block being shaped accordingly, the pins projecting from the angular part of the block and the circular part extending outside the hub for connection with the shifting means.

In testimony whereof, I do affix my signature.

ANTON NOSAN.